C. O. POOLE.
TIRE NUT TURNING DEVICE.
APPLICATION FILED AUG. 11, 1919.
1,377,028.
Patented May 3, 1921.
2 SHEETS—SHEET 1.
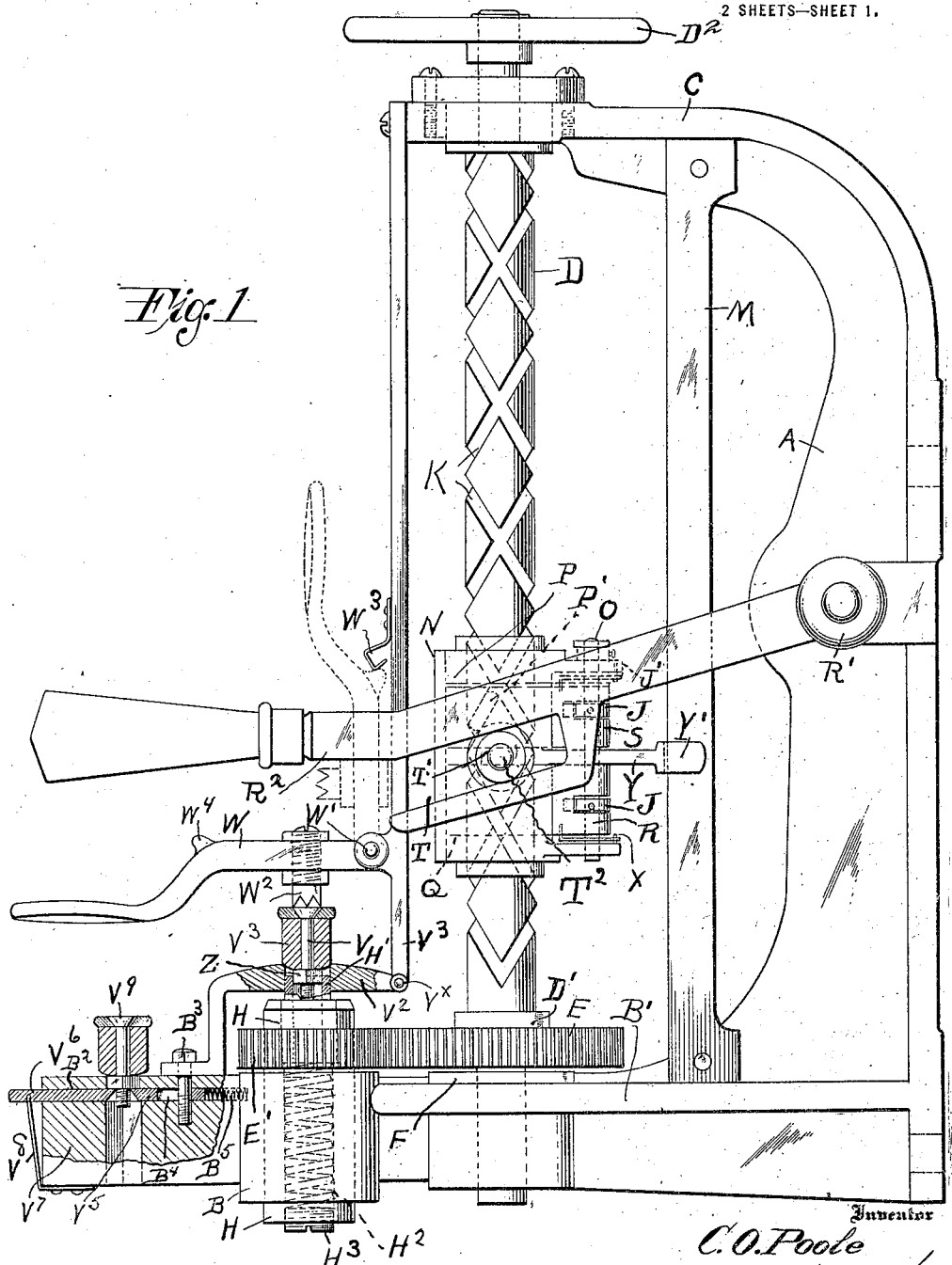

C. O. POOLE.
TIRE NUT TURNING DEVICE.
APPLICATION FILED AUG. 11, 1919.
1,377,028.
Patented May 3, 1921.
2 SHEETS—SHEET 2.
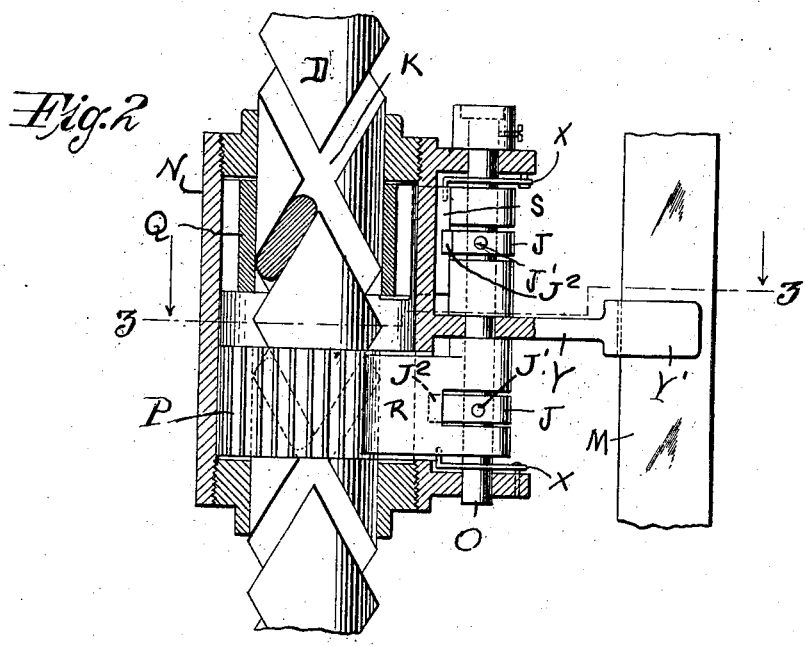
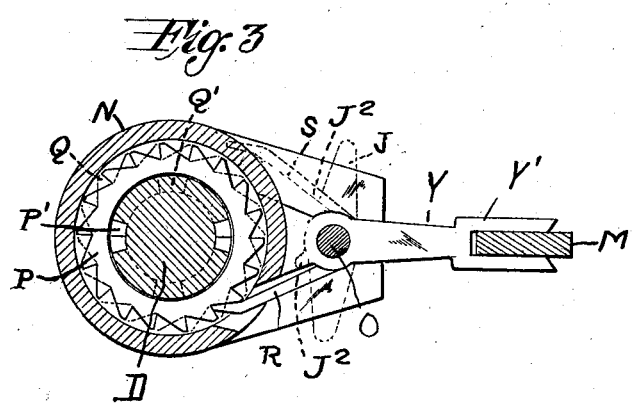

UNITED STATES PATENT OFFICE.

CLIFFORD O. POOLE, OF COBDEN, ILLINOIS.

TIRE-NUT-TURNING DEVICE.

1,377,028.  Specification of Letters Patent.  Patented May 3, 1921.

Application filed August 11, 1919. Serial No. 316,668.

*To all whom it may concern:*

Be it known that I, CLIFFORD O. POOLE, a citizen of the United States, residing at Cobden, in the county of Union and State of Illinois, have invented certain new and useful Improvements in Tire-Nut-Turning Devices, of which the following is a specification, reference being had therein to the accompanying drawing.

This invention relates to new and useful improvements in tire nut turning devices.

My invention comprises various details of construction, combination and arrangement of parts which will be hereinafter fully described, shown in the accompanying drawings and then specifically defined in the appended claim.

My invention is illustrated in the accompanying drawings which, with the letters of reference marked thereon, form a part of this application, and in which:

Figure 1 is a side elevation of the apparatus, parts being in section.

Fig. 2 is an enlarged detail sectional view through a part of the apparatus.

Fig. 3 is a sectional view on line 3—3 of Fig. 2.

Reference now being had to the details of the drawings by letter:

A designates the frame of the machine, in which a reversely spiraled shaft D is mounted in suitable bearings. A gear wheel E is keyed to rotate with said shaft, and D' is a bumper mounted upon the shaft adjacent to said wheel. Mounted in a cylindrical bearing B in a laterally extending portion B' of the frame is a socket member H, which carries a spring pressed socket member H' adapted to engage a nut to be tightened indicated at Z. A coiled spring H² is mounted within the socket member H, the tension of which is regulated by a screw H³ mounted in the lower threaded end of the socket member. A gear wheel E' is fixed to said socket member H and is in mesh with the gear E carried upon the shaft D.

Said shaft D has reversely spiraled grooves K, which are provided for the purpose of giving the shaft a rotary movement through the medium of a mechanism, which will be presently described, a hand wheel D² being also provided for the purpose of applying rotary motion directly to the shaft.

Mounted to have a reciprocating movement upon the shaft D is a sleeve N, detail of which is shown in Figs. 2 and 3 of the drawings, and within which are mounted two cylindrical ratchets P and Q, the former being a right hand ratchet and the latter a left hand ratchet, and each has oppositely inclined lugs P' and Q' respectively, which slide in the spiral grooves at points diametrically opposite.

A rock shaft O is journaled in suitable bearings within the sleeve and has pawls R and S fixed thereto, designed to engage respectively the reversely arranged ratchets, and reversing bars J are held to the rock shaft by means of set screws J', and are provided with lugs J² which, bearing against the pawls R and S, afford means whereby the shaft O may be turned in one direction or the other, according as it may be desired to throw one or the other of the pawls into engagement with one or the other of said ratchets. Pivotally mounted upon a stud R' is a lever R² having a slot T in one edge thereof designed to engage an anti-friction roller T' mounted upon a bar T², which is carried by the sleeve N, and serves as a means for moving the same, as the lever is swung upon its pivot R' for the purpose of rotating the shaft in one direction or the other. Suitable ratchet springs X upon the shaft O bear against the pawls to hold the same yieldingly in engaging positions.

In order to guide the housing as it reciprocates, a suitable arm Y is carried thereby, and has a bifurcated end which slides upon the bar M which is spaced in parallelism with the shaft D. Pivotally mounted upon a pin W', upon the bar V³, is a lever W carrying a screw W² mounted in a threaded aperture in the lever and has its lower end terminating in points adapted to frictionally engage the end of a bolt V held in the rim V' of a wheel. Said lever has an integral lug W⁴ projecting therefrom, which is adapted to be engaged by a spring catch W³ when the lever is in the raised position shown in dotted lines in Fig. 1 of the drawings.

A bracket arm V² is fastened by means of a bolt Vˣ to said bar V³. The outer end of said arm is fastened to the frame by means of a bolt B³.

In operation, a ratchet pawl is adjusted to cause one or another of the ratchets to be rotated in one direction, whereupon, by the oscillation of the lever R² upon its pivot R', sliding the sleeve N alternately upwardly and downwardly upon the shaft D, step by step rotary motion is imparted to said shaft.

By the reversal of the member J reversing the pawls R and S, the direction of rotation of the shaft D is also reversed, so that the device is adapted for either screwing or unscrewing nuts and to rotate the gears in either direction and through the gear connections with the wrench socket member.

What I claim to be new is:

The combination with a frame embodying spaced vertical journal bearings, of a shaft reversely spiraled journaled in the bearings, operating means slidable upon the shaft, bars rigidly secured to the frame upon opposite sides of and in parallelism with the shaft, means engaging one of said bars for holding the operating mechanism against rotation, an offset rigidly connected with the other bar and provided with a seat, a wrench member mounted to rotate in the seat, means connecting the wrench member with the shaft, a manual lever pivoted to the last mentioned bar, an engaging member carried by the lever, provided with a plurality of engaging points, a lever adapted to actuate the operating means, and an additional means for applying power to the shaft.

In testimony whereof I hereunto affix my signature in presence of two witnesses.

CLIFFORD O. POOLE.

Witnesses:
A. C. KOHLER,
J. W. THOMAS.